United States Patent [19]

Masuhara et al.

[11] Patent Number: 5,607,985
[45] Date of Patent: Mar. 4, 1997

[54] PHOTOPOLYMERIZATION INITIATOR FOR VISIBLE LIGHT-POLYMERIZING ADHESIVE

[75] Inventors: Eiichi Masuhara, Bunkyo-ku; Shigeo Komiya, Urawa; Takeyuki Sawamoto, Suginami-ku; Yumiko Satou, Hino, all of Japan

[73] Assignee: Adell Co., Ltd., Tokyo, Japan

[21] Appl. No.: 290,867

[22] PCT Filed: Dec. 21, 1992

[86] PCT No.: PCT/JP92/01669

§ 371 Date: Oct. 4, 1994

§ 102(e) Date: Oct. 4, 1994

[87] PCT Pub. No.: WO94/14913

PCT Pub. Date: Jul. 7, 1994

[51] Int. Cl.$^6$ .................... C09J 4/00; C08F 2/50
[52] U.S. Cl. .................... 522/28; 522/48; 522/64; 522/53; 522/99; 522/182; 522/183; 156/327
[58] Field of Search .................... 522/28, 48, 64, 522/96, 99, 103, 182, 183; 156/327

[56] References Cited

U.S. PATENT DOCUMENTS

| | | | |
|---|---|---|---|
| 4,189,365 | 2/1980 | Schmitt et al. | 204/159.23 |
| 4,298,738 | 11/1981 | Lechtken et al. | 546/22 |
| 4,447,520 | 5/1984 | Henne et al. | 430/281 |
| 4,514,037 | 4/1985 | Bishop et al. | 350/96.23 |
| 4,636,533 | 1/1987 | Janda et al. | 522/14 |
| 4,710,523 | 12/1987 | Lechtken et al. | 522/14 |
| 4,882,001 | 11/1989 | Gonzalez et al. | 156/273.3 |
| 4,948,694 | 8/1990 | Ohkkuma et al. | 430/138 |
| 5,047,442 | 9/1991 | Sasaki et al. | 522/27 |
| 5,053,316 | 10/1991 | Suzuki et al. | 430/281 |
| 5,180,757 | 1/1993 | Lucey | 522/76 |
| 5,192,815 | 3/1993 | Okada et al. | 523/115 |
| 5,306,739 | 4/1994 | Lucey | 522/42 |
| 5,472,991 | 12/1995 | Schmitt et al. | 522/28 |

FOREIGN PATENT DOCUMENTS

| | | |
|---|---|---|
| 60-32801 | 2/1985 | Japan. |
| 2-252775 | 11/1990 | Japan. |
| 2218104A | 11/1989 | United Kingdom. |

*Primary Examiner*—Susan W. Berman
*Attorney, Agent, or Firm*—Nixon & Vanderhye

[57] ABSTRACT

Photopolymerization initiator for the visible light-polymerizing adhesives; and the visible light-polymerizing adhesives comprising the photopolymerization initiator, an aliphatic tertiary amine and a radical polymerizing monomer. The visible light-polymerizing adhesive of the invention has good transparency without coloring after photopolymerization as well as good adhering activity. It also has colorless, good transparency after photopolymerization and good adhering activity in an UV irradiation test, as well as excellent light resistance showing very little color change and deterioration in an UV irradiation test. The visible light-polymerizing adhesive of the invention is also excellent in photopolymerizing activity. Furthermore, the visible light-polymerizing adhesive of the invention has photopolymerizing activity not only to visible light but also to near-UV. It hardly has problems of such decrease in transparency caused by both kinds of lights as coloring and color change.

7 Claims, No Drawings

PHOTOPOLYMERIZATION INITIATOR FOR VISIBLE LIGHT-POLYMERIZING ADHESIVE

TECHNICAL FIELD

The present invention relates to a photopolymerizing adhesive which polymerizes when visible light is irradiated, and to a photopolymerization initiator therefor. More specifically, the invention relates to the adhesive having such an excellent photopolymerizing activity as polymerizability for a short time by irradiation of visible light; excellent, colorless and transparent appearance after photopolymerization; and excellent light resistance after adhesion.

BACKGROUND ART

Conventionally, as photopolymerizing adhesives ultraviolet light(UV)-polymerizing ones were used, which were obtained by adding a UV polymerization initiator that generates free radicals by absorbing UV, such as benzoinalkylether, 1-cyclohexylphenylketone, to a polyfunctional radical polymerizing monomer (e.g., 1,6hexanedioldi(meth)acrylate, bisphenol-A-epoxy modified di(meth)acrylate), or a monofunctional radical polymerizing monomer (e.g., N-vinylpyrrolidone hydroxyethyl-(meth)acrylate).

The UV-polymerizing adhesives are usually one-liquid type, and show a long pot life and such a practical adhesive property as polymerizability by irradiation of UV for a short time, e.g., a few minutes. Accordingly, they are excellent in handling and in adaptation to a prompt adhering operation so that they have been widely used in replace of adhesives such as epoxy resin adhesives which require mixing a main agent with a curing one or heating at an adhesion step.

Lately, however, fast and simple adhesion as obtainable by conventional photopolymerizing adhesives has been increasingly required for opaque materials and UV-absorbing materials such as colored glass, ceramics, polycarbonates and polyvinyl chloride.

Furthermore, it has been pointed out that UV so far used for polymerization of conventional photopolymerizing adhesives has problems. One problem is that UV has a strong chemical action against a human body and causes danger at work. The other problem is that UV ray apparatus must have facilities such as a specialized power supply and exhausting duct. This will require much cost and make the scale of the facilities bigger. Thus, photopolymerizing adhesives have been increasingly expected which can be polymerized by a safer and simpler light source.

Recently, a new type visible light-polymerizing adhesive, which polymerizes by using visible light, has been used as a photopolymerizing adhesive which meets the above purposes.

As this adhesive, for example, an adhesive comprising at least one ketone selected from fluorenone and diketone and at least one organic peroxide, as initiators for visible light polymerization, is disclosed in JP-A-2/110178. In addition, an adhesive comprising, as a visible light-polymeriztation initiator, camphorquinone or benzil is disclosed in JP-A-2/252775.

Examples of other adhesives of a visible light-polymerization type are those containing, instead of a photopolymerization initiator for conventional UV-polymerizing adhesives, an initiator showing absorbance in visible light range (such as thioxanthone derivatives, e.g., anthraquinone, 3-ketocoumanine, 2-chlorothioxanthone, and isopropylthioxanthone; accridone derivatives, e.g., 10-butyl-2-chloroacridone; or thiopyrylium salt derivatives), or those containing an organic dye such as methylene blue.

Normally, to such visible light polymerizing adhesives is added a tertiary amine (e.g., tri-n-butylamine, dimethylaminoethylmethacrylate, N, N-dimethyl-p-toluidine or N, N-dimethyl-p-benzoate) or an organic peroxide (e.g., benzoyl peroxide), for the purpose of increasing reactivity of a photopolymerization initiator.

These visible light-polymerizing adhesives make adhesion of UV-opaque materials by photopolymerization possible, which was so far difficult. Besides, the visible light-polymerizing adhesives have been increasingly used for, e.g., adhesion of dental resins in the mouth in dental fields, because they allow to use a highly safe visible light-source, such as a halogen lamp, as a light source for polymerization.

To the visible light-polymerizing adhesives may be added organic dyes or pigments so as to provide an adhesive layer with a desired color tone after adhesion and polymerization, which is difficult by using UV-polymerizing adhesives.

However, most of conventional visible light-polymerizing adhesives often turn into yellow or brown color after polymerization due to remaining initiators, or turn into yellow, brown or red color due to an unfavorable side reaction during photopolymerization, not being able to yield a transparent adhesive product.

Furthermore, conventional visible light-polymerizing adhesives have a defect that an initially colorless and transparent color tone after photopolymerization will turn into yellow or brown color by exposure to light containing UV, such as sunlight, for a short time, i.e. a defect of low light-resistance.

An attempt has been made to prevent the above discoloration or coloring of the visible light-polymerizing adhesives after photopolymerization, by reducing an amount of the used initiator or omitting the use of tertiary amines together with the photopolymerization initiator. In this case, however, a new problem occurs in that photopolymerizing activity of the visible light-polymerizing adhesives will be too low to obtain a practical photopolymerizing speed. Thus, this is not a final solution.

Accordingly, conventional visible light polymerizing adhesives have not been applied to adhesion of optical parts such as lens and prism, which require a high transparency after adhesion; to adhesion of window glass and objects for out-door display that requires high light-resistance; or to adhering and building up of glass handicrafts that require an excellent aesthetic property.

Furthermore, in case that a conventional visible light-polymerizing adhesive is mixed with a dye and pigment, color tone will be dark and dull after photopolymerization and it will be difficult to make a colored adhesive product showing an excellent aesthetic feature, because of coloring after photopolymerization and fade-out of colorless transparency by sun light.

This invention has been accomplished with an aim to solve the above disadvantages of conventional visible light-polymerizing adhesives.

Thus, an object of the invention is to provide a visible light-polymerizing adhesive having such an excellent photopolymerizing activity as photopolymerizability for a short time by irradiation of visible light; excellent transparency of exhibiting colorless transparency after photopolymerization; and excellent light-resistance of causing no color change or deterioration after exposure to light containing UV such as sun light.

DISCLOSURE OF THE INVENTION

An object of the present invention is to solve these problems in the prior art by providing a visible light polymerizing adhesive comprising at least one free radical polymerizing monomer having at least one carbon-carbon unsaturated bond in its molecule; a photopolymerization initiator of both 0.01–5 weight % of at least one compound represented by the general formula (1) and 0.01–5 weight % of at least one compound represented by the general formula (2); and 0.1–20 weight % of at least one aliphatic tertiary amine as an accelerator for photoreaction:

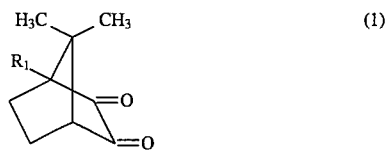

wherein $R_1$ represents a substituent selected from —$CH_3$, —COOH, —COOCH$_2$CH$_2$Br, —COCl, and —COOCH$_3$.

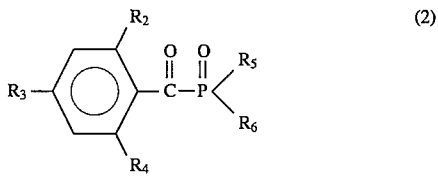

wherein $R_2$, $R_3$, and $R_4$ independently represent hydrogen or methyl group, and $R_5$ and $R_6$ independently represent phenyl or methoxy group.

The present invention will be described in detail below.

Specific examples of the compounds represented by the general formula (1) include camphorquinone, 7,7-dimethyl-2,3-dioxobicyclo[2,2,1]heptane-1-carboxylic acid, 7,7-dimethyl-2,3-dioxo[2,2,1]heptane-1-carboxy-2-bromoethylester, 7,7-dimethyl-2, 3-dioxo[2,2,1]heptane-1-carboxymethylester, and 7,7-dimethyl-2,3-dioxobicyclo[2,2,1]heptane-1-carboxylic acid chloride. Particularly, camphorquinone, 7,7-dimethyl-2, 3-dioxobicyclo[2,2,1]heptane-1-carboxylic acid are preferred in view of polymerization speed and transparency.

One or more compounds represented by the general formula (1) may be used if its amount or their amounts are in the range between 0.01–5 weight %.

If the used amount of the compound represented by the general formula (1) is less than the above range, it will cause a problem that photopolymerizing activity of the resulting adhesive is not satisfactory. If the used amount of the compound represented by the general formula (1) is greater than the above range, it will cause a problem that yellow coloring occurs after photopolymerization and that light-resistance decreases, against exposure to light containing UV, e.g., sunlight.

Specific examples of the compounds represented by the general formula (2) include benzoyldiphenylphosphine oxide, 2,6-dimethylbenzoyldiphenylphosphine oxide, 2,4,6-trimethylbenzoyldiphenylphosphine oxide, benzoyldiethoxyphosphine oxide, 2,4,6-trimethylbenzoylmethoxyphenylphosphine oxide, 2,4,6-trimethylbenzoyldiethoxyphosphine oxide. Particularly, preferred are 2,6-dimethylbenzoyldiphenylphosphine oxide, 2,4,6-trimethylbenzoyldiphenylphosphine oxide, 2,4,6-trimethylbenzoylmethoxyphenylphosphine oxide, since they are very stable in store and excellent in optical reactivity to visible light in a short wavelength range, thereby giving an advantage by use together with the compound represented by the formula (1).

The used amount of the compound represented by the formula (2) is 0.01–5 weight %. When the sum of the used amounts is in the range of the invention, combined use of two or more compounds is allowed. If the used amount of the compound represented by the general formula (2) is less than the range of the invention, it causes a problem that photopolymerizing activity decreases to result in no polymerization by irradiating light even for a long time. If the used amount of the compound represented by the formula (2) is more than the range of the invention, it causes a problem that yellow coloring occurs after photopolymerization and light-resistance becomes unsatisfactory against exposure to light containing UV, e.g., sun light.

It is desired that the sum of the used amounts of the compounds represented by the formulae (1) and (2) in the invention is suitably increased or decreased, depending on the thickness of an adhesive determined by the applied amount of the adhesive; it is preferred that a standard amount is adjusted to 0.2–7 weight % to realize a good harmony of photopolymerizing activity of the adhesive with excellent transparency without coloring nor color change.

As for the compounds represented by the formulae (1) and (2) in the invention, it is preferred that the ratio of the used amount of the former to that of the latter is selected from the range between 1:5 and 5:1 because colorless transparency or light resistance after photopolymerization can become more excellent.

Specific examples of aliphatic tertiary amines used in the invention are tri-n-butylamine, triethanolamine, triethylamine, N-methyldiethanolamine, N-ethyldiethanolamine, triisopropanolamine, dimethylaminoethylbenzoate, dimethylaminomethyl (meth)acrylate, dimethylaminoethyl (meth)acrylate, diethylaminomethyl (meth)acrylate, diethylaminoethyl (meth)acrylate, and diisopropylaminomethyl (meth)acrylate. Particularly, preferred are such aliphatic tertiary amines having a (meth)acryloxy group as dimethylaminomethyl (meth)acrylate, diethylaminomethyl (meth) acrylate, dimethylaminoethyl (meth)acrylate, and diethylaminoethyl (meth)acrylate, owing to their excellent photoreaction activity.

Two or more aliphatic tertiary amines defined in the invention can simultaneously be used at a level of 0.1–20 weight %. If the used amount of the aliphatic tertiary amine(s) is less than the range of the invention, it causes a problem that photopolymerizing activity decreases not to give useful polymerization speed. On the other hand, if the used amount of the aliphatic amine is more than the range of the invention, it causes problems that coloring is observed in the adhered matter after photopolymerization and that light-resistance is poor.

The used amounts of the compounds represented by the general formulae (1) and (2) in the invention and the aliphatic tertiary amine are further adjusted within the range specified in the invention, depending on the thickness of an adhesive layer after photopolymerization of the visible light-polymerizing adhesive.

Specifically, when the adhesive after photopolymerization has thickness of several micrometers, it is preferred that each of the compounds represented by the general formulae (1) and (2) is used between 0.2 weight % and 5 weight % and that the aliphatic tertiary amine is used in the range between several weight % to 20 weight %.

When the thickness of the adhesive layer after photopolymerization is adjusted to 0.1 mm or more, each of the compounds represented by the general formulae (1) and (2) is preferably adjusted to the range which is specified in the invention and which is below 0.2 weight %. The used amount of the aliphatic tertiary amine is preferably adjusted to the range which is specified in the invention and which is below 5 weight %. This is because concentration of radicals, which are generated by light irradiation in the visible-light polymerizing adhesive of the invention, is adjusted to the range of maximum efficiency regardless of the thickness of the adhesive layer, and thus advantages of the adhesive are maximized.

It is particularly preferred that each of the used amounts of the compounds represented by the general formulae (1) and (2) for the visible light-polymerizing adhesive of the invention is adjusted to 0.1–1 weight % and the used amount of the aliphatic tertiary amine is adjusted to 1–10 weight %, because of wide applicability for usual adhesion.

Specific examples of the radical polymerizing monomer having at least one carbon-carbon unsaturated bond in its molecule used in the invention are monofunctional (meth) acrylates, e.g., butoxymethyl (meth)acrylate, 2-ethylhexyl (meth)acrylate, lauryl (meth)acrylate, hydroxyethyl (meth) acrylate, hydroxypropyl (meth)acrylate, glycerol (meth) acrylate, 4 -(meth)acryloxytricyclo[5,2,1,0$^{2,6}$]decane, isobornyl (meth)acrylate, isodecyl (meth)acrylate, phenoxyethyl (meth)acrylate, cyclohexyl (meth)acrylate, methyl (meth)acrylate, ethyl (meth)acrylate, butyl (meth)acrylate, benzyl (meth)acrylate, phenyl (meth)acrylate, tetrahydrofurfuryl (meth)acrylate, 4 (meth) acryloxyalkyl acid phosphate, and γ-(meth)acryloxyalkyltrialkoxysilane and; monofunctional monomer, e.g., acryloylmorpholine, N-vinylpyrrolidone, N,N-dimethylacrylamide, N-vinylcarbazol, styrene, vinyl acetate, acrylonitril, and trialkoxy silane.

Other examples are polyfunctional (meth)acrylates, such as bisphenol-A-di(meth)acrylate, alkylene oxide modified bisphenol-A-di(meth)acrylate, 1,4-butanediol di(meth)acrylate, 1,6-hexanediol di(meth)acrylate, 1,9-nonanediol di(meth)acrylate, ethylene glycol di(meth)acrylate, triethylene glycol di(meth)acrylate, polyethylene glycol di(meth)acrylate, polypropylene glycol di(meth)acrylate, trimethylolpropane tri(meth)acrylate, pentaerythritol tetra(meth)acrylate, dipentaerythritol penta (meth)acrylate, bis[4-(meth)acryloxymethyl]tricyclo[5,2,1,0$^{2,6}$]decane, bis[4-(meth)acryloxy-2-hydroxypropyloxyphenyl]propane, isophorone diisocyanate modified urethane di(meth)acrylate, hexamethylene diisocyanate modified urethane di(meth)acrylate, trimethylhexamethylene diisocyanate modified urethane (meth)acrylate, trimethylhexamethylene-diisocyanate modified urethane (meth)acrylate, aliphatic epoxy modified di(meth)acrylate, and oligosiloxanyl di(meth)acrylate represented by the following general formulae (3) and (4); and polyfunctional monomers,. e.g., triallylisocyanurate, vinyl (meth)acrylate, and allyl (meth)acrylate.

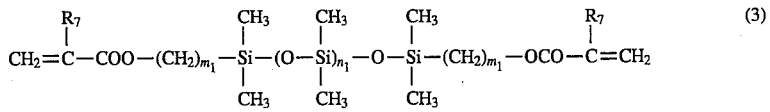

(3)

wherein $R_7$ in the formula, $m_1$, and $n_1$ represent hydrogen or methyl group, an integer of 2–4, and an integer of 0–60, respectively.

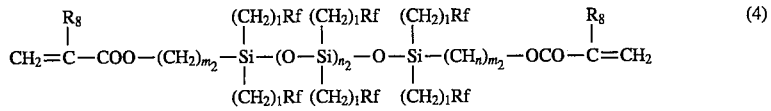

(4)

wherein, $R_8$, Rf, l, $m_2$, and $n_2$ represent hydrogen or methyl group, perphloroalkyl group, an integer of 1–4, an integer of 2–4, and an integer of 0–60, respectively.

The radical polymerizing monomer having at least one carbon-carbon unsaturated bond in its molecule is appropriately selected according to the aim of use of an adhesive; however, it is preferred to use several or more weight % of a monomer having in its molecule a substituent of high polarity, such as hydroxy (meth)acrylate, glycerol (meth) acrylate, bis[4-(meth)acryloxy-2-hydroxypropyloxyphenyl] propane, N-vinylpyrrolidone, and N, N-dimethylacrylamide, since more excellent adhering activity can be obtained.

Adhering activity to such inorganic materials as glass, ceramics and metals can be further increased by simultaneous use of a monomer having in its molecule such an alkoxysilane as trialkoxyvinylsilane, and γ-(meth)acryloxyalkyltrialkoxysilane.

In addition, for selection of the radical polymerizing monomer in the invention, it is preferred to use the polyfunctional monomer of 10 or more weight % of the whole of the radical polymerizing monomers, since photopolymerizing activity of adhesive can become good.

Following the above explanation on composition of the invention, effects of the invention will be explained below.

As a photopolymerization initiator of visible light-polymerizing adhesives, the compound represented by the general formula (1) or (2) was so far used solely or with an UV-polymerization initiator such as benzophenone and 1-cyclohexylphenylketone, or used in combination with a photoreaction accelerator such as tertiary amines, because each of the compounds of the general formulae (1) and (2)

is a photoreaction initiator which generates free radicals by irradiation of visible light.

However, when the compound of the general formula (1) or (2) is used as above, the problems of coloring after polymerization and low light resistance were inevitable, as generated by other conventional visible-light photopolymerizing adhesives.

The inventors have made the invention according to finding that only when a visible light-hardening adhesive is prepared by simultaneously using the compounds of the formulae (1) and (2) in the range of a specific content, the adhesive can have excellent colorless, transparent features after polymerization and exhibit excellent light-resistance, i.e., very little change into e.g., yellow or brown color even by long time exposure to light containing UV such as sun light.

In other words, the invention has been made based on the unique phenomenon that by using a photopolymerization initiator containing both the compounds represented by the general formulae (1) and (2) in each specific amount, photochemical interaction occurs in both the compounds, during photopolymerization, so as to remarkably decease coloring after photopolymerization in comparison with the case of sole use of each of these two compounds in the same amount as above.

As a result, in the visible light-polymerizing adhesive of the invention, light absorbance, which causes photochemical reaction, e.g., color change and deterioration after photopolymerization is very low and excellent light resistance is effected against exposure to light containing UV, e.g., sun light.

On the other hand, the aliphatic tertiary amine has an action to highly increase photoreaction activity of the compounds represented by general formulae (1) and (2) without disturbing above-mentioned excellent interaction. It is preferred to use the aliphatic tertiary amine in combination with the polymerization initiator of the invention such that the ratio of the former to the latter is 1:100–2:1.

Such action is unique in the invention and not found from the combination with photopolymerization initiators used in conventional visible light-polymerizing adhesives. For example, using either compound of the general formula (1) or (2) in the invention does not solve the problems of coloring and color change.

As above, the invention gives visible light-polymerizing adhesives which have an excellent aesthetic feature giving colorless transparency after photopolymerization, and excellent light resistance against light containing UV, e.g. sun light, as well as good photopolymerizing activity.

Finally, the visible light-polymerizing adhesive of this invention is very useful because of the following features.

The visible light-polymerizing adhesive of this invention fast adheres by photopolymerization based on irradiation of visible light of the range from 400 nm to around 500 nm and, as stated above, gives no coloring and excellent light resistance. Besides, these characteristics are exhibited by the irradiation of near UV of the wavelength 340 nm–400 nm, too.

In conclusion, the visible light-polymerizing adhesives of the invention have not only visible light-polymerizing activity but also photopolymerizing activity to near-UV. This results in the excellent feature, for visible light irradiation and UV irradiation, that excellent activity is effected whether photopolymerization is conducted by visible light irradiation or UV irradiation.

Consequently, the visible light-polymerizing adhesives of this invention can be used for wide range of wavelength of light from UV range to visible light ranges so as to allow use of a high pressure mercury lamp and a chemical lamp as a source of UV and use of a halogen lamp, sun light, and a fluorescent lamp as a source of visible light. It also has advantages of very wide freedom in selecting a light source for using photopolymerization and of excellent interchangeability with conventional arts.

[Best embodiment for carrying out the invention]

The invention will be explained in detail by the following examples.

EXAMPLE 1

A visible light-polymerizing adhesive of the invention was obtained by mixing 0.2 weight parts of camphorquinone, as a compound represented by the general formula (1); 0.3 weight parts of 2,4,6-trimethylbenzoyl-diphenylphosphine oxide, as a compound represented by the general formula (2); 4 weight parts of dimethylaminomethylmethacrylate, as an aliphatic tertiary amine; and 10 weight parts of bis[acryloxymethyl]tricyclo[5,2,1,0$^{2,6}$]decane, 60 weight parts of methacryloxytricyclo[5,2,10$^{2,6}$]decane, and 20 weight parts of 2-hydroxyethylmethcrylate, as radical polymerizing monomers having at least one carbon-carbon unsaturated bond.

After the adhesive was applied to a piece of low alkaline, colorless, transparent glass of 1.1 mm thickness and then on it a piece of the same kind of glass was placed, visible light was irradiated for 2 minutes with an optical fiber light source having a 150 watts halogen lamp (Cold Light, ex Hoya Schott Ltd.)

After the light irradiation, the pieces of low alkaline glass firmly adhered to each other and showed colorless and transparent appearance. Measurement of light transmissivity of the sticked glass pieces by a spectrophotometer showed 90 % at wavelength of 400 nm, giving excellent transparency.

Next, strong UV was irradiated on the sticked low alkaline glass pieces for 20 hours, using a high pressure mercury lamp. In the irradiation of UV, short wavelength UV below 300 nm was cut by using Pyrex glass as a filter to prevent coloring by solarization of the low alkaline glass itself.

After the irradiation of UV for 20 hours, in the low alkaline glass, firm adhesion and colorless, transparent appearance were kept. The measurement of light transmissivity using the spectrophotometer showed 90% at 400 nm of wavelength and did not show decrease in transparency by the ultraviolet irradiation.

In addition, adhesion of the same low alkaline glass pieces as above was made by irradiation visible light for 2 minutes with an 8 W straight tube-fluorescent lamp, as one of tests of activity to various light sources for visible light, for the visible light-polymerizing adhesive made in the Example.

Thus obtained, sticked low alkaline glass pieces firmly adhered in the same manner as ones obtained with the abovementioned fiber light source, and gave colorless and transparent appearance. Light transmissivity of the sticked product at 400 nm was 89% and gave the same excellent transparency as one polymerized with the fiber light source.

When adhesion of low alkaline glass pieces was made by exposure to sun light for 10 minutes, with the visible light-polymerizing adhesive obtained in the Example, colorless, transparent product was obtained which gave the same firm adhesion as the above-mentioned one. This sticked product showed 90% transmissivity at 400 nm of wavelength and this transmissivity was of excellent grade.

As stated above, the visible light-polymerizing adhesive according to the present Example had good visible light-polymerizing activity and an excellent aesthetic feature of colorless transparency, and also had excellent light resistance against UV.

In addition, the visible light-polymerizing adhesive of the Example had good photopolymerizing activity to various different visible light sources, such as a halogen lamp, a fluorescent lamp, and sun light. It gave similar adhering activity and transparency. Thus, it makes it possible to select various light sources in accordance with the purposes of adhesion, thereby providing very high value for application.

EXAMPLES 2–7

Visible light-polymerizing adhesives of the invention were prepared by various combination of the compounds represented by the general formulae (1) and (2), aliphatic tertiary amines, and radical polymerizing monomers having at least one carbon-carbon unsaturated bond. Adhesion of glass pieces of 1.1 mm thickness was made, in the same manner in Example 1, by irradiation with the optical fiber-light source used in Example 1 for 2 minutes.

Table 1 shows chemical compositions of the visible light-polymerizing adhesives of Examples 2–7, photopolymerizing activity at adhesion, appearance after photopolymerization, adhering activity, light transmissivity at wavelength of 400 nm, appearance after 20 hour irradiation of a high pressure mercury lamp, and light transmissivity at the wavelength 400 nm.

As clearly shown in Table 1, the visible light-polymerizing adhesives of the invention gave good adhering activity, excellent photopolymerizing activity, colorless, transparency after photopolymerization, and excellent light resistance against UV.

EXAMPLE 8

After the visible light-polymerizing adhesive obtained from Example 1 was applied to a yellow piece of opaque glass which was 10% in light transmissivity at wavelength of 510 nm and 0% in light transmissivity in wavelength ranges from 490 nm of visible light to 200 nm of UV, a piece of the same colored glass was placed on it. The resultant was exposed to visible light irradiation, for 2 minutes, with a 150 W metal halide lamp for illumination.

The glass pieces firmly adhered after the light irradiation. The visible light-polymerizing adhesive made by the invention was non-transparent as shown in the Example and was allowed to adhere easily to materials through which UV cannot pass, by photopolymerization.

EXAMPLE 9

The visible light-polymerizing adhesives of the invention, which were obtained in Example 1, were photopolymerized by using a high pressure mercury lamp and a chemical lamp, which were conventional light sources of UV, so as to try adhesion of low alkaline glass pieces like as Example 1.

UV irradiation for 10 minutes by using the high pressure mercury lamp gave the same firm adhesion and colorless transparency in appearance of the low alkaline glass, as exhibited in Example 1.

The measurement of light transmissivity of this product at wavelength of 400 nm yielded 90% of transmissivity, which was the same transparency as in Example 1 in which the visible light source was used.

Irradiation of UV for 2 minutes with the 20 W chemical lamp having the output peak at wavelength of 360 nm also gave firm adhesion of test pieces of low alkaline glass. The test pieces gave colorless, transparent appearance and 90% light transparency at wavelength of 400 nm.

As shown by the Example, the visible light-polymerizing adhesive of the invention also had photopolymerizing activity to a UV-light source; and had the same appearance and transparency after photopolymerization as ones photopolymerized with visible light sources.

EXAMPLE 10

A visible light-polymerizing adhesive of the invention was prepared by mixing 0.03 weight parts of camphorquinone as a compound represented by the general formula (1); 0.02 weight parts of 2,4,6-trimethylbenzoyl-diphenylphosphine oxide as a compounds represented by the general formula (2); 5 weight parts of N, N-dimethylaminoethylmethacrylate; and 35 weight parts of polyethylene glycol diacrylate, 30 weight parts of bisphenol-A-epoxy modified dimethacrylate, and 30 weight parts of hydroxyethylmethacrylate, as a radical polymerizing monomer having in its molecule at least one carbon-carbon unsaturated bond.

Subsequently, a ring-like spacer made of silicone rubber of 25 mm internal diameter and 5 mm height was installed rubber on a hard glass disk of 30 mm diameter, and the visible light-polymerizing adhesive of the Example was poured into the spacer, up to the top end.

Next, after the top of the spacer was covered with the same hard glass, visible light irradiation was carried out for 20 minutes through the top cover, using the same 8 W fluorescent lamp as that used in Example 1.

After the visible light irradiation, the hard glass disks sandwiching the spacer firmly adhered together with the visible light-polymerizing adhesive. The thick product thus obtained had colorless appearance and excellent transparency.

This product was subjected to continuous irradiation of ultra violet light for 20 hours with a high pressure mercury lamp, in the same manner as in Example 1.

After the UV irradiation, change of appearance such as change into yellow color in the hard glass disks obtained from the Example was not observed, and excellent transparency was kept, too.

Although the adhesive in the Example was as thick as 5 mm, it was confirmed that, by adjusting the amount of a photopolymerization initiator for the visible light-polymerizing adhesive of this invention, a product could easily be obtained without coloring after adhesion nor change in color by UV-irradiation.

Comparative Example 1

A visible light-polymerizing adhesive was prepared in the same manner as in Example 1, except in that isopropylthioxanthone, which was a conventional initiator for visible light-polymerization, was used instead of the compounds represented by the general formulae (1) and (2).

Adhesion of pieces of low alkaline glass was made using the visible light-polymerizing adhesive obtained as above, in the same manner as in Example 1. The product firmly adhered and it was colorless and transparent in appearance. Light transmissivity was measured 88% at wavelength 400 nm using a spectrophotometer.

Subsequently, UV was irradiated for 20 hours using a high pressure mercury lamp in the same manner as in Example 1. After the irradiation of ultra violet light, observation of appearance of the product demonstrated change into yellow color. The light transmissivity at wavelength 400 nm was 82% to give insufficient light resistance.

Comparative Examples 2–4

In the same manner as in Comparative Example 1, several visible light-polymerizing adhesives were prepared by using different visible light-polymerization initiators and tertiary amines from those in the invention. Adhesion of pieces of low alkaline glass was made by irradiating visible light. Then, photopolymerizing activity, adhering activity, appearance after photopolymerization, and light transmissivity at wavelength 400 nm were investigated.

In addition, the sticked low alkaline glass pieces were exposed to UV irradiation, using a high pressure mercury lamp, as in Example 1, and then observation was made on its appearance after the UV irradiation and light transmissivity at wavelength 400 nm.

Table 2 shows chemical compositions of the visible light polymerizing adhesives thus prepared and results of these tests.

From the results shown in the Table 2, visible light-polymerizing adhesives which do not fall within the scope of invention revealed defects that coloring was observed after adhesion regardless of good photopolymerizing, that adhering activities and light resistance were unsatisfactory regardless of excellent transparency, or that photopolymerizing activity was insufficient for applicability as an adhesive.

Comparative Examples 5–9

As comparisons, visible light polymerizing adhesives were prepared under the condition out the scope of this invention, (e.g. no use of a part of the compounds represented by the general formulae (1) & (2) and the aliphatic tertiary amines). With these adhesives, adhesion of pieces of low alkaline glass was made by irradiating visible light, as in Example 1.

Table 3 shows compositions of the visible light-adhesives thus obtained, photopolymerizing and adhering activities, appearance and light transmissivity after photopolymerization.

As shown in Table 3, when the compound represented by the general formula (1) or (2) in this invention was solely used or when these compounds were used in an amount outside the range specified in this invention, there occurred problems of low photopolymerizing activity resulting in insufficient adhesion, and of yellowing after photopolymerization.

Comparative Example 10

A visible light-polymerizing adhesive was prepared in the same manner as in Example 1 except in that 3 parts of 1-hydroxycyclohexyl-phenylketone as a conventional photopolymerization initiator were used instead of 2,4,6-trimethylbenzoyldiphenylphosphine oxide as a compound represented by the general formula (2) in Example 1.

Adhesion of glass pieces colored as Example 8 was attempted by visible light irradiation, using the visible light-polymerizing adhesive obtained as above.

However, the visible light-polymerizing adhesive did not photopolymerize even after photopolymerization for 10 minutes, to result in no adhesion of the colored glass pieces.

Comparative Example 11

A visible light-polymerizing adhesive was prepared in the same manner as in Example 1 except in that 0.1% by weight of isopropylthioxanthone were used instead of the compound represented by the general formula (2) in Example 1 and that 0.3 weight parts of dimethylaminoethylbenzoate were used instead of the aliphatic tertiary amine.

Adhesion of pieces of low alkaline glass was attempted by visible light polymerization of this adhesive using an optical fiber-light source with a halogen lamp, as in Example 1.

The pieces of low alkaline glass firmly adhered after the visible light irradiation for 2 minutes, resulting in colorless transparency in its appearance. Light transmissivity of this sticked product was 88% at wavelength of 400 nm.

In addition, adhesion of low alkaline glass pieces was tried by UV polymerization of the adhesive of the Comparative Example, using UV generated by a high pressure mercury lamp, as in Example 9.

After the UV irradiation for 10 minutes, the pieces of low alkaline glass firmly adhered; however, the pieces showed light brown color to give 82% of light transmissivity at wavelength of 400 nm.

The conventional visible light-polymerizing adhesive used in the Comparative Example was excellent in transparency due to a little coloration by visible light-polymerization; however, UV-polymerization gave no excellent aesthetic product due to yellowing.

[Industrial Applicability]

As clearly shown in the above Examples and Comparative Examples, the visible light-polymerizing adhesive of the invention has good adhering activity, good transparency without coloring after photopolymerization, and excellent light resistance giving very little color change and deterioration in a UV irradiation test.

Furthermore, the visible light-polymerizing adhesive of the invention has excellent photopolymerizing activity to make adhesion possible by such various visible light sources as a halogen lamp, a fluorescent lamp, and sun light. It also gives, for a short time, excellent adhering activity in adhesion of e.g., opaque, strongly colored glass. These are excellent features as a photopolymerizing adhesive.

Consequently, the visible light-polymerizing adhesive of the invention has remarkable functions to solve problems of conventional art.

Furthermore, the visible light-polymerizing adhesive of the invention has photopolymerizing activity not only to visible light sources but also to near-UV, and has a feature that decrease in transparency such as coloring and color change is caused very little, whether a light source is visible or near-UV one.

These excellent activities, which are characteristic effects of the invention, can be realized, only when the compounds represented by the general formulae (1) & (2) and the aliphatic tertiary amine in the invention are simultaneously used in a specific range.

Explanation of Abbreviations. CQ: camphorquinone, DOHC: 7,7-dimethyl-2,3-dioxobicyclo[2,2,1]heptane-1-carboxylic acid, DOHCM: 7,7-dimethyl-2,3-dioxobicyclo[2,2,1]heptane-1-carboxylic acid methyl ester, TPO: 2,4, 6-trimethylbenzoyldiphenylphosphine oxide, DBPO: 2,6-dimethyl benzoylphenylphosphine oxide, ITX: isopropylthioxanthone, DETX: Diethylthioxanthone, DM: dimethylaminoethylmethacrylate, DE: diethylaminoethylmethcrylate, DAMA: dimethylaminomethylmethylacrylate, TBA: tri-n-butylamine, DMPT: N,N-dimethyl-p-toluidine, DMAMP: o-dimethylaminomethylphenol, BA: dimethylaminoethylbezoate, FA: bis[methacryloxy-penta ethoxy-phenyl] propane, MTCD:

methacryloxytricyclo[5,2,1,0$^{2,6}$]decane, HEMA: 2-hydroxyethylmethacrylate, HX: caprolactone modified neopentylglycol hydroxy pivalic acid diacrylate, PETM: pentaerythritol trimethacrylate, 3G: triethyleneglycol dimethcrylate, HEA: 2-hydroxyethylacrylate, OSDM: oligosiloxanyl dimethacrylate (average molecular weight 1000), HDMA: 1,6-hexanedioldimethacrylate, TVSi: triethoxyvinylsilane, BPAEA: bis(methacyloxy-2-hydroxypropoxyphenyl)propane, HDDA: 1,6-hexanediol diacrylate, MPTMS: γ-methacryloxypropyltrimethoxysilane, MTCDA: acryloxytricyclo[5,2,1,0,$^{2,6}$]decane, EMA: ethylmethacrylate, PMA: methacryloxyethyl acid phosphate.

TABLE 1

| Example No. | Compound (1) | Compound (2) | Aliphatic tertiary amine | Radical polymerizing monomer | Photo-polymerization | Adhesion | Transparency after photopolymerization with visible light | | Transparency after UV-irradiation | |
|---|---|---|---|---|---|---|---|---|---|---|
| | | | | | | | Appearance | Light transmissivity (%) | Appearance | light transmissivity (%) |
| 2 | DOHC 0.2 | TPO 0.3 | DE 3.5 | FA/MTCD/HEMA 16/60/20 | good | good | colorless & transparent | 90 | colorless & transparent | 89 |
| 3 | CQ 1.5 | TPO 0.5 | DM 4.0 | HX/PETM/3G/HEA 20/33/17/25 | good | good | colorless & transparent | 89 | colorless & transparent | 88 |
| 4 | CQ 1.0 | TPO 1.0 | DE 3.0 | OSDM/MTCD/ HEA/TVSi 30/40/15/5 | good | good | colorless & transparent | 89 | colorless & transparent | 88 |
| 5 | DOCH 1.5 | DBPO 2.0 | DM 5.0 | HDMA/MTCD/ HEMA/TVSi 20/60/15/5 | good | good | colorless & transparent | 90 | colorless & transparent | 90 |
| 6 | DOHCM 1.0 | TPO 1.0 | DAMA 3.0 | BPAEA/HDDA/ HEA/MPTMS 50/25/18/7 | good | good | colorless & transparent | 90 | colorless & transparent | 89 |
| 7 | CQ 2.0 | TPO 0.5 | TBA 7.0 | HX/MTCDA/ HEMA/EMA/PMA 10/70/20/3/1 | good | good | colorless & transparent | 90 | colorless & transparent | 90 |

Numbers below abbreviations of compounds show the used amount of each compound as "parts by weight".

TABLE 2

| Comparative Example No. | Visible photopolymerization initiator | Tertiary amine | Radical polymerizing monomer | Photo-polymerization | Adhesion | Transparency after photopolymerization | | Transparency after UV-irradiation | |
|---|---|---|---|---|---|---|---|---|---|
| | | | | | | Appearance | Light transmissivity (%) | Appearance | light transmissivity (%) |
| 2 | Benzyl 1.5 | DMPT 1.5 | FA/MTCD/HEMA 16/60/20 | good | good | light yellow | 87 | yellow | 80 |
| 3 | ITX 2.0 | DMAMP 1.0 | HDMA/MTCD/ HEMA/TVSi 20/60/15/5 | good | good | yellow & transparent | 80 | light brown & transparent | 72 |
| 4 | DETX 0.2 | BA 0.3 | OSDM/PETM/ MA/HOP 35/30/5/25 | good | good | yellow & transparent | 85 | brown & transparent | 79 |

Numbers below abbreviations of compounds show the used amount of each compound as "parts by weight".

TABLE 3

| Comparative Example No. | Compound (1) | Compound (2) | Aliphatic tertiary amine | Radical polymerizing monomer | Photo-polymerization | Adhesion | Transparency after photopolymerization | |
|---|---|---|---|---|---|---|---|---|
| | | | | | | | Appearance | Light transmissivity (%) |
| 5 | DOHC 0.2 | — | DE 3.5 | FA/MTCD/HEMA 16/60/20 | insufficient | easy leaving | — | — |
| 6 | — | TPO 5.0 | — | OSDM/MTCD/ HEA/TVSi 30/40/15/5 | good | good | yellow & transparent | 80 |
| 7 | CQ | TPO | DM | OSDM/MTCD/ | good | good | yellow & | 70 |

TABLE 3-continued

|  |  |  |  |  |  |  | Transparency after photopolymerization | |
|---|---|---|---|---|---|---|---|---|
| Comparative Example No. | Compound (1) | Compound (2) | Aliphatic tertiary amine | Radical polymerizing monomer | Photopolymerization | Adhesion | Appearance | Light transmissivity (%) |
|  | 7.0 | 0.1 | 5.0 | MA/HEMA 30/40/15/5 |  |  | transparent |  |
| 8 | CQ 2.0 | TPO 7.0 | DM 10 | FA/MTCD/HEMA 16/60/20 | good | good | light brown & transparent | 66 |
| 9 | CQ 0.5 | TPO 0.5 | DM 28 | BPAEA/HDDA/ HEA/MPTMS 50/25/18/7 | good | good | light brown & transparent | 75 |

Numbers below abbreviations of compounds show the used amount of each compound as "parts by weight".

We claim:

1. In a visible light-polymerizing adhesive for bonding glass, metal and/or ceramics which is colorless, transparent and can be cured under visible light, having an excellent ultraviolet light resistance when being cured, and including:

(a) a photopolymerization initiator, (b) 0.1 to 20 weight % of an aliphatic tertiary amine, (c) 5 weight % or more of hydroxyethyl(meth)acrylate, (d) a monofunctional (meth)acrylate having one (meth) acrylate group, and (e) 10 weight % or more of a polyfunctional(meth)acrylate having more than one (meth)acrylate group, the improvement which comprises said photopolymerization initiator comprising 0.01 to 5 weight % of Compound (1) represented by the following formula (1)

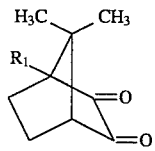

wherein $R_1$ represents a substituent selected from —$CH_3$, —COOH, —COOCH$_2$CH$_2$Br, —COCl and —COOCH$_3$, and 0.01 to 5 weight % of Compound (2) represented by the following formula (2)

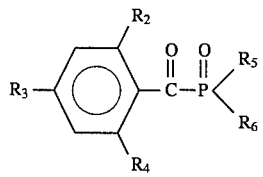

wherein $R_2$, $R_3$, and $R_4$ are each independently hydrogen or methyl, and $R_5$ and $R_6$ are each independently phenyl, methoxy or ethoxy, wherein the ratio of the amount of Compound (1) to the amount of Compound (2) is in the range of 1:5 to 5:1.

2. The visible light-polymerizing adhesive of claim 1, wherein the total amount of Compounds (1) and (2) is 0.2 to 7 weight % based on the whole amount of the adhesive.

3. The visible light-polymerizing adhesive of claim 1 or 2, wherein Compound (1) is selected from the group consisting of camphorquinone, 7,7-dimethyl-2,3-dioxobicyclo[2.2.1]heptane-1-carboxylic acid, 7,7-dimethyl-2,3-dioxo[2.2.1]heptane-1-carboxy-2-bromoethylester, 7,7-dimethyl-2,3-dioxo[2.2.1]heptane-1-carboxymethylester and 7,7-dimethyl-2,3-dioxobicyclo[2.2.1]heptane-1-carboxylic acid chloride.

4. The visible light-polymerizing adhesive of claim 1 or 2 wherein Compound (2) is selected from the group consisting of benzoyldiphenylphosphine oxide, 2,6-dimethylbenzoyldiphenylphosphine oxide, 2,4,6-trimethylbenzoyldiphenylphosphine oxide, benzoyldiethoxyphosphine oxide, 2,4,6-trimethylbenzoylmethoxy phenylphosphine oxide, and 2,4,6-trimethylbenzoyldiethoxyphosphine oxide.

5. The visible light-polymerizing adhesive of claim 1 or 2 wherein the aliphatic tertiary amine (b) is selected from the group consisting of dimethylaminomethyl (meth)acrylate, diethylaminomethyl (meth)acrylate, dimethylaminoethyl (meth)acrylate, diethylaminoethyl (meth)acrylate and tri-n-butylamine.

6. The visible light-polymerizing adhesive of claim 1 or 2 wherein the monofunctional (meth)acrylate (d) is selected from the group consisting of butoxymethyl (meth)acrylate, 2-ethylhexyl (meth)acrylate, lauryl (meth)acrylate, hydroxyethyl (meth)acrylate, hydroxypropyl (meth)acrylate, glycerol (meth)acrylate, (meth)acryloxytricyclo [5.2.1.0$^{2,6}$]decane, isobutyl (meth)acrylate, isodecyl (meth) acrylate, phenoxyethyl (meth)acrylate, cyclohexyl (meth) acrylate, methyl (meth)acrylate, ethyl (meth)acrylate, butyl (meth)acrylate, benzyl (meth)acrylate, phenyl (meth) acrylate, tetrahydrofurfuryl (meth)acrylate, (meth)acryloxyalkyl acid phosphate and γ-(meth)acryloxyalkyltrialkoxysilane.

7. The visible light-polymerizing adhesive of claim 1 or 2 wherein the polyfunctional (meth) acrylate (e) is selected from the group consisting of bisphenol-A di(meth)acrylate, alkylene oxide modified bisphenol- di(meth)acrylate, 1,4-butanediol dimethacrylate, 1,6-hexanediol di(meth)acrylate, 1,9-nonanediol di(meth)acrylate, ethylene glycol di(meth)acrylate, triethylene glycol di(meth)acrylate, polyethylene glycol (meth)acrylate, polypropylene glycol di(meth)acrylate, trimethylolpropane tri(meth)acrylate, pentaerythritol tetra(meth)acrylate, dipentaerythritol penta(meth)acrylate, bis[(meth)acryloxymethyl]tricyclo[5.2.1.0$^{2,6}$] decane, bis[4-(meth)acryloxy-2-hydroxypropyloxyphenyl] propane, isophorone diisocyanate modified urethane di(meth)acrylate, trimethylhexamethylene diisocyanate modified urethane (meth)acrylate, aliphatic epoxy modified di(meth)acrylate and oligosiloxanyl di(meth)acrylate.

* * * * *